United States Patent Office 3,409,618
Patented Nov. 5, 1968

3,409,618
TRI-SUBSTITUTED ISOCYANURATE
George E. Ham, Lake Jackson, and Homer L. Hairston, Freeport, Tex., and Donald A. Tomalia, Midland, Mich., assignors to The Dow Chemical Company, Midland, Mich., a corporation of Delaware
No Drawing. Filed May 4, 1966, Ser. No. 547,420
9 Claims. (Cl. 260—248)

ABSTRACT OF THE DISCLOSURE

Tri-substituted isocyanurates are prepared by rearrangement of aziridinyl formates or by reacting phenyl haloformates with aziridine. Said tri-substituted isocyanurates are bactericidal.

---

This invention relates to trisubstituted isocyanurates and to a process for their production.

The preparation of the products of this invention can be illustrated by the following reaction:

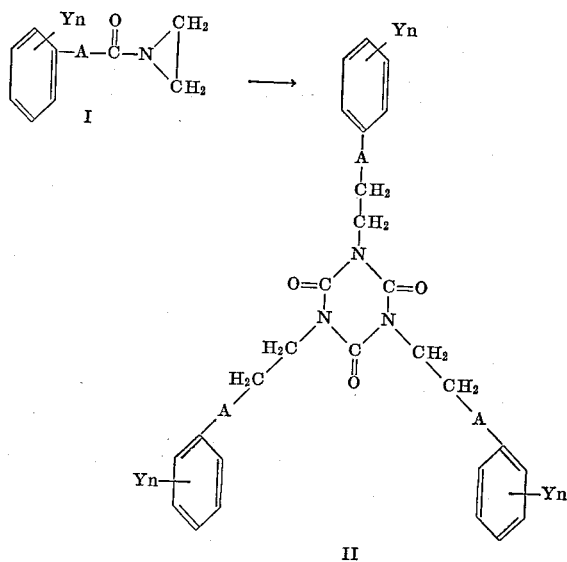

wherein Y is an electronegative group, $n$ is an integer of 0–5, and A is oxygen or sulfur. The electronegative groups can be, e.g., chloro, nitro, bromo, trifluoromethyl, and the like.

The compounds hereof are bactericidal, having particular effectiveness against *Escherichia coli*, as well as being pesticidal (U.S. Patent No. 3,075,979). They are also useful as intermediates in preparation of the known 4-(2-phenoxyethyl) urazoles by conventional methods.

Rearrangement of the starting aziridinyl formate I to the desired isocyanurate II proceeds at moderately elevated temperatures in a non-reactive, non-aqueous, non-alcoholic solvent, preferably one having a low dielectric constant, such as xylne, carbon tetrachloride and the like. Normally the reaction to good yields is slow, particularly at room temperatures and below. Raising the temperature short of the boiling point of the resulting solution speeds the reaction, as does the presence of tertiary amines (e.g., pyridine, dimethylaniline, triethylamine, tributylamine, triethanolamine, triethylenediamine, and the like), a thiosulfate, or non-reactive substances giving a phenoxy or halide ion as catalysts. Reaction pressures are not critical, atmospheric conditions being preferred for convenience.

Alternatively, the isocyanurate II can be obtained by reacting an appropriately-substituted phenyl haloformate with ethyleneimine according to the following reaction scheme:

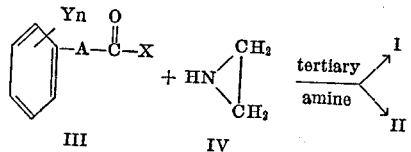

wherein Y, A and $n$ have the values above assigned, and X is chloro, bromo or iodo. The reaction is conducted in the presence of a tertiary amine, such as pyridine, dimethylaniline, triethylamine, tributylamine, triethanolamine, triethylenediamine, and the like.

The concentration of tertiary amine in the reaction mixture governs the direction of the reaction. Thus, greater than about a 1:1 molar ratio of tertiary amine to phenyl haloformate gives the desired isocyanurate II, while less than about a 1:1 molar ratio favors production of the aziridinyl formate I.

In this alternative procedure solvents for the reactants are not necessary. However, where solvents are employed they desirably are those of non-polar character, such as the aromatic, aliphatic, or cycloaliphatic liquid hydrocarbons, including, e.g., benzene, toluene, heptane, xylene and the like.

The reaction III+IV proceeds satisfactorily over a relatively broad temperature range, the upper limit being marked by the boiling point of any solvent employed. However, temperatures of 0–50° C. are preferred. Pressures are not critical, atmosphreic pressure being common as a matter of convenience.

In both reactions for direct production of the isocyanurate II, separation of the product is by conventional means, as typified hereinafter.

The following examples illustrate the invention as described, but in no sense are they to be construed as limiting the scope thereof.

Example 1.—Tris[2-(2,4-dichlorophenoxy)ethyl] isocyanurate

Into a reaction vessel equipped with means for stirring, temperature control and refluxing was charged a 20% (by weight) solution of 2,4-dichlorophenyl aziridinyl formate in xylene (5 gm. in 20 gm. of xylene). To this was added 0.1 gm. of sodium-2,4-dichlorophenoxide. The reaction mixture was heated for 70.5 hours at 142° C. At the end of this time the solvent was removed under reduced pressure. Recrystallization from cyclohexane-acetone (2:1) gave 64% yield of essentially pure tris[2-(2,4-dichlorophenoxy)ethyl]isocyanurate, M.P. 151–152° C. IR analysis was consistent with the structure.

Example 2.—Tris[2-(2,4-dichlorophenoxy)ethyl] isocyanurate

Following the procedure of Example 1 but employing a 20% solution of 2,4-dichlorophenyl aziridinyl formate in carbon tetrachloride (3.2 gm. in 12.8 gm. of carbon tetrachloride), the reaction mixture was heated for 8 hours and 50 minutes at 80° C. in the presence of 0.1 gram of triethylamine catalyst. The solvent was removed under reduced pressure. IR analysis showed the reaction mixture to contain 69% yield of tris[2-(2,4-dichlorophenoxy)ethyl]isocyanurate. This product was recrystallized from a cyclohexane-acetone (1:1) to give a recrystallized product melting at 152° C.

Example 3.—Tris[2-(4-nitrophenoxy)ethyl]isocyanurate

Following the procedure of Example 2 but substituting 4-nitrophenyl aziridinyl formate for the 2,4-dichlorophenyl aziridinyl formate therein and heating the reaction mixture for 20 hours at 56° C. gave tris[2-(4-nitrophenoxy)ethyl]isocyanurate.

Example 4.—Tris[2-(4-chlorophenylthio)ethyl] isocyanurate

Into a three-necked 500-ml. flask was charged 20.69 gm. (0.1 mole) 4-chlorophenylthio chloroformate in 150 ml. of diethyl ether (absolute). The mixture was cooled to 0–5° C. in a salt-ice bath. To the cooled mixture was added, drop-wise and with stirring, a solution of 10.10 g. (0.1 mole) triethylamine and 4.3 gm. (0.1 mole) of ethyleneimine in 100 ml. of diethyl ether over a period of 40 minutes. The reaction temperature was not allowed to exceed 7–8° C. After addition was complete, the reaction mixture was stirred at room temperature for about 20 minutes and filtered free of triethylamine hydrochloride. The filter cake was washed with 50 ml. of diethylketone and the filtrates combined. Evaporation of solvent gave 14.90 gm. (70% of theoretical) of white, glittering plates having a crude M.P. of 61–63° C. NMR and infrared analyses were consistent with the structure for p-chlorophenyl aziridinyl thioformate. Allowing this product to stand at room temperature in a stoppered bottle for 1.25 hours caused the solid to melt into a colorless oil. On standing further at room temperature for 7 days, the liquid resolidified into a white solid mass. Recrystallization from acetone-methanol mixture gave a white powder, M.P. 115–116° C., analysis of which was consistent with the structure for tris[2 - (4 - chlorophenylthio)ethyl]isocyanurate.

*Analysis.*—Calculated for $C_{27}H_{24}Cl_3N_3O_3S_3$: Calculated N, 6.55%. Found: N, 6.32%.

Example 5.—Tris[2-(phenylthio)ethyl]isocyanurate

Following essentially the procedure of Example 4 but substituting phenylthio chloroformate for the 4-chlorophenylthio chloroformate therein gave phenyl aziridinyl thioformate, M.P. 32–36° C., of which 84.3 gm. was then dissolved in 150 ml. of undried p-xylene. The resulting solution was refluxed for 4.25 hours and allowed to stand for 7 days at room temperature. A white precipitate of N,N′-bis[2-(phenylthio)ethyl] urea M.P. 145–146.5° C., was formed. The precipitate was filtered and the filtrate diluted with diethyl ether to give 6.8 gm. of white, glittering flakes having NMR and infrared analyses consistent with the structure of tris[2-(phenylthioethyl)]isocyanurate, M.P. 108–110° C.

*Analysis.*—Calculated for $C_{27}H_{27}N_3O_3S_3$: S, 17.8%. Found: S, 17.1%.

Example 6

Substituting other aziridinyl formates and thioformates of the formula:

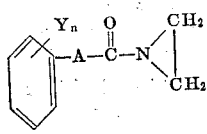

wherein Y is chloro, nitro, bromo, or trifluoromethyl, $n$ is 0–5, and A is oxygen or sulfur, for the dichlorophenyl aziridinyl formate of Examples 1 and 2 and the chlorophenyl aziridinyl thioformate and phenyl aziridinyl thioformate of Examples 4 and 5, respectively, is productive of the corresponding isocyanurates (II), such as the unsubstituted or 2-chloro-, 3-chloro-, 2,4,6-trichloro-, 2-nitro-, 2,4-dinitro-, 3-nitro, 3,5-dinitro-, 3-trifluoromethyl, 2-chloro-4-nitro- and 2,4-dibromo-substituted phenoxyethyl or phenylthioethyl isocyanurates.

Example 7.—Tris[2-(2,4-dichlorophenoxy)ethyl] isocyanurate

A reaction vessel equipped with means for stirring, temperature control and refluxing was charged with 50.8 gm. of ethyleneimine (1.82 moles), 119.6 gm. of triethylamine (1.82 moles) and 400 ml. of benzene. To this mixture was added a solution of 275 gm. (1.21 moles) of 2,4-dichlorophenyl chloroformate in 1800 ml. of benzene. Addition was dropwise over a period of about 40 minutes while maintaining a temperature of about 20° C. The resulting mixture was digested for 3 hours and 20 minutes at room temperature. The reaction product was then filtered to remove triethylamine hydrochloride and the resulting product evaporated to dryness. Residue was 279.7 gm. of a light yellow solid which was washed in benzene, stirred overnight in benzene, filtered, washed again in benzene and evaporated under reduced pressure. The resulting solid was dissolved in methanol, which, on evaporation, gave 69.7 gm. of a slightly yellow solid, M.P. 90–130° C. This product was recrystallized from methanol to give 42 gm. of a white powder having an IR spectrum consistent with 80% tris[2-(2,4-dichlorophenoxy)ethyl]isocyanurate. Recrystallization of this material from carbon tetrachloride gave a solid, M.P. 151–152° C. The filtrate from this recrystallization was evaporated under reduced pressure to give 128.0 gm. of amber liquid having an IR spectrum consistent with 70% tris[2 - (2,4 - dichlorophenoxy)ethyl]isocyanurate. The combined yield was 45.4% of theoretical.

Example 8

Substituting other phenyl haloformates and phenyl halothioformates of the formula:

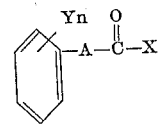

wherein Y is chloro, nitro, bromo, or trifluoromethyl, $n$ is 0–5, and A is oxygen or sulfur, for the dichlorophenyl chloroformate of Example 7 is productive of the corresponding isocyanurates (II), such as the unsubstituted or 2-chloro-, 3-chloro-, 2,4,6-trichloro-, 2-nitro-, 2,4-dinitro-, 3-nitro, 3,5-dinitro-, 3-trifluoromethyl, 2-chloro-4-nitro- and 2,4-dibromo-substituted phenoxyethyl or phenylthioethyl isocyanurates.

It is to be understood that the substitutions of Examples 6 and 8 necessitate no change in reaction conditions other than those obvious to one skilled in the art as dictated by the physical properties of the individual reactants.

Replacing the triethylamine catalyst in Examples 2, 3 and 7 with other tertiary amines such as pyridine, diethylaniline, triethylamine, tributylamine, triethanolamine, triethylenediamine, and the like, imposes no new requirements on the reaction, these catalysts being used interchangeably with any combination of primary reactants.

We claim:
1. A tri-substituted isocyanurate of the formula:

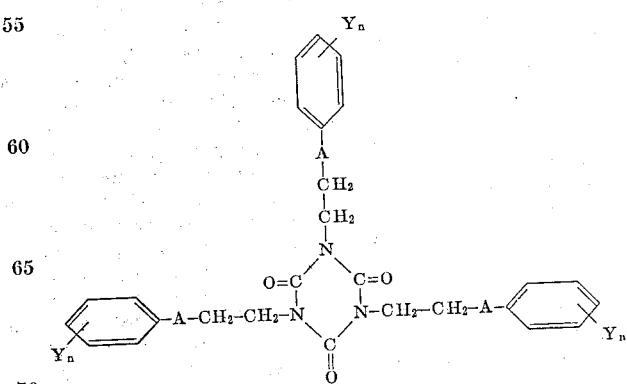

wherein each Y independently is an electronegative substituent selected from the group consisting of bromo, chloro, nitro, trihalomethyl and hydrogen, $n$ is an integer of 0–5, and A is oxygen or sulfur.

2. The compound of claim 1 wherein A is oxygen.

3. The compound of claim 2 wherein each phenyl group is 2,4-dichloro-substituted.

4. The compound of claim 2 wherein each phenyl group is 4-nitro-substituted.

5. The compound of claim 1 wherein Y is hydrogen, bromo, chloro, or nitro.

6. The compound of claim 1 wherein $n$ is 0–3.

7. The compound of claim 1 wherein A is sulfur.

8. The compound of claim 7 wherein each phenyl group is 4-chloro-substituted.

9. The compound of claim 7 wherein each $n$ is zero.

References Cited

UNITED STATES PATENTS

| | | | |
|---|---|---|---|
| 2,536,849 | 1/1951 | Kaiser et al. | 260—248 |
| 3,075,979 | 1/1963 | Tazuma et al. | 260—248 |

OTHER REFERENCES

Iwakura et al.: J. Org. Chem, vol. 25, pp. 1118–23 (1960) QD 241.J6.

HENRY R. JILES, *Primary Examiner.*

J. M. FORD, *Assistant Examiner.*